US011809597B2

(12) United States Patent
Biasse et al.

(10) Patent No.: US 11,809,597 B2
(45) Date of Patent: Nov. 7, 2023

(54) ANONYMITY PRESERVING DATA COLLECTION USING HOMOMORPHIC ENCRYPTION

(71) Applicant: UNIVERSITY OF SOUTH FLORIDA, Tampa, FL (US)

(72) Inventors: Jean-Francois Biasse, Tampa, FL (US); William Youmans, Tampa, FL (US); Sriram Chellappan, Tampa, FL (US); Nathan Fisk, Tampa, FL (US); Noyem Khan, Tampa, FL (US)

(73) Assignee: University of South Florida, Tampa, FL (US)

( * ) Notice: Subject to any disclaimer, the term of this patent is extended or adjusted under 35 U.S.C. 154(b) by 286 days.

(21) Appl. No.: 17/213,965

(22) Filed: Mar. 26, 2021

(65) Prior Publication Data

US 2021/0303728 A1 Sep. 30, 2021

Related U.S. Application Data

(60) Provisional application No. 63/000,228, filed on Mar. 26, 2020.

(51) Int. Cl.
*G06F 21/62* (2013.01)
*H04L 51/52* (2022.01)
(Continued)

(52) U.S. Cl.
CPC .......... *G06F 21/6254* (2013.01); *H04L 9/008* (2013.01); *H04L 9/3006* (2013.01); *H04L 51/52* (2022.05); *H04L 51/58* (2022.05)

(58) Field of Classification Search
CPC ..... G06F 21/6254; H04L 51/58; H04L 51/52; H04L 9/008; H04L 9/3006; H04W 4/12; H04W 4/14; H04W 88/184; G06Q 50/01
See application file for complete search history.

(56) References Cited

U.S. PATENT DOCUMENTS

| 2010/0014657 A1* | 1/2010 | Kerschbaum | ........... H04L 9/008 380/28 |
| 2018/0091466 A1* | 3/2018 | Friedman | .............. G06F 40/289 |

(Continued)

OTHER PUBLICATIONS

Aguilar-Melchor C., et al "Recent Advances in Homomorphic Encryption: A Possible Future for Signal Processing in the Encrypted Domain," in IEEE Signal Processing Magazine, vol. 30, No. 2, pp. 108-117 (Year: 2013).*

*Primary Examiner* — Daniel B Potratz
(74) *Attorney, Agent, or Firm* — Meunier Carlin & Curfman LLC

(57) ABSTRACT

A public key generated by each user of a plurality of users is used to encrypt the contacts for that user. The results are sent to a server by each user. The key generated by each user is then distributed to every other user in the system, and each recipient encrypts their contacts with the keys. The result of these encryptions for all contacts for all recipients is then received by the server, and the server computes an encrypted computation of equality of two contacts and sends all computations back to the original user. The user can use the homomorphic property of the crypto protocol (e.g., a private key) to determine a set of users that are matched as contacts with the other users. The binary results are returned to the server, and the server computes a graph using the results.

10 Claims, 4 Drawing Sheets

(51) Int. Cl.
  *H04L 51/58* (2022.01)
  *H04L 9/00* (2022.01)
  *H04L 9/30* (2006.01)

(56) References Cited

U.S. PATENT DOCUMENTS

2019/0394019 A1* 12/2019 Gao .................. H04L 9/008
2020/0244435 A1* 7/2020 Shpurov ............. G06F 21/64

* cited by examiner

ANONYMITY PRESERVING DATA COLLECTION USING HOMOMORPHIC ENCRYPTION

CROSS-REFERENCE TO RELATED APPLICATIONS

This application claims priority to U.S. Provisional Patent Application No. 63/000,228, entitled "ANONYMITY PRESERVING DATA COLLECTION USING HOMOMORPHIC ENCRYPTION", and filed on Mar. 26, 2020. The contents of which is hereby incorporated by reference in its entirety.

BACKGROUND

Massive amounts of digital communication data are being generated today. Such data includes emails, phone calls, SMS messages, and messages on social media platforms and/or applications. As of today, users are increasingly demanding privacy (of information they share), and anonymity (of their identities). On a related note, there are thousands of organizations today that actively mine digital data for numerous (legal and sometimes illegal) purposes.

From an "information" perspective, advertisements essentially rely on mining what content an individual user is posting about, and then marketing products to that user based on that content. Further, the types of information that are trending on social media can be identified so that these can be disseminated to other companies etc.

From a "user" perspective, social media companies, try to make recommendations of friends etc., based on monitoring identities of an individual user and their connections in the social network. From a more mathematical perspective, knowledge of user identities and connections can help understand how the networks scale and adapt; how to provision resources for scalability; and how to identify fake identities from graph theoretic properties of social connections etc.

SUMMARY

A system uses homomorphic encryption that allows connections to be established among users with each user creating their own independent keys. A public key generated by each user is used to encrypt the contacts for that user. Contacts may include friends in a social network, email contacts, telephone contacts, etc. The result of the encryption is sent to a central server. The key generated by each user is then distributed to every other user in the system, and each recipient encrypt their contacts with the public keys that are sent by the server. The result of these encryptions for all contacts for all recipients is then received by the server, and the server computes an encrypted computation of equality of two contacts and sends all computations back to the original user. The user can use the homomorphic property of the crypto protocol (e.g., a private key) to determine a set of users that are matched as contacts with the other users. The binary results are returned to the server, and the server computes a graph using the results. Throughout the process, no one other than a user can decrypt any information successfully to reveal identities, which provides anonymity and privacy protection to all users, while also allowing third parties to use the generated graph for analysis or study.

In an embodiment a method for graphing relationships in an application while providing anonymity is provided. The method includes: receiving a first public key from a first user of an application by a computing device; receiving a first plurality of contacts in the application from the first user by the computing device, wherein each contact of the first plurality of contacts is encrypted using the first public key; providing the first public key to a second user of the application by the computing device; receiving a second plurality of contacts in the application from the second user by the computing device, wherein each contact of the second plurality of contacts is encrypted using the first public key; for each contact pair comprising a contact from the first plurality of contacts and a contact from the second plurality of contacts, generating an encrypted computation of equality for the contact pair using the first public key by the computing device; providing the generated encrypted computation of equality for each contact pair to the first user by the computing device; receiving, for each contact pair, an indication of whether the contacts in the pair are the same or different by the computing device from the first user; and generating a graph of the relationship between the first user and the second user in the application using the received indication for each pair by the computing device.

Implementations may include some or all of the following features. The method may further include repeating the steps for each user of a plurality of users of the application. The application may be one or more of an SMS application, a phone application, an email application, and a social media application. The first plurality of contacts may include one or more of email addresses, telephone numbers, or contacts in a social networking application. The first user may decrypt each encrypted computation of equality using a first private key.

In an embodiment, a method for graphing relationships in an application while providing anonymity is provided. The method includes: for each user of a plurality of users of an application, receiving a public key associated with the user by a computing device; for each user of the plurality of users, provide the public key associated with the user to each user of the plurality of users by the computing device; for each user of a plurality of users, receiving a plurality of sets of contacts associated with the user by the computing device, wherein each set of contacts associated with the user is encrypted using a public key of a different user of the plurality of users; for each user of the plurality of users, generating a plurality of encrypted computations of equality for each contact of the user and each contact of a different user of the plurality of users that was encrypted using the public key of the user by the computing device; for each user of the plurality of users, providing the generated plurality of encrypted computations for the user to the user by the computing device; for each user of the plurality of users, receiving, for each encrypted computation of the plurality of computations associated with the user, an indication of whether encrypted computation was correct or incorrect; and generating a graph of the relationships of the users of the application using the received indications by the computing device.

Implementations may include some or all of the following features. The application may be one or more of an SMS application, a phone application, an email application, and a social media application. The first plurality of contacts may include one or more of email addresses, telephone numbers, and contacts in a social networking application.

In an embodiment, a system for graphing relationships in an application while providing anonymity is provided. The system includes at least one processor; and a memory storing a plurality of instructions that when executed by the at least one processor cause the at least one processor to:

receive a first public key from a first user of an application; receive a first plurality of contacts in the application from the first user, wherein each contact of the first plurality of contacts is encrypted using the first public key; provide the first public key to a second user of the application; receive a second plurality of contacts in the application from the second user, wherein each contact of the second plurality of contacts is encrypted using the first public key; for each contact pair comprising a contact from the first plurality of contacts and a contact from the second plurality of contacts, generate an encrypted computation of equality for the contact pair using the first public key; provide the generated encrypted computation of equality for each contact pair to the first user; receive, for each contact pair, an indication of whether the contacts in the pair are the same or different from the first user; and generate a graph of the relationship between the first user and the second user in the application using the received indication for each pair.

Implementations may include some or all of the following features. The system may repeat the for each user of a plurality of users of the application. The application may be one or more of an SMS application, a phone application, an email application, or a social media application. The first plurality of contacts may include one or more of email addresses, telephone numbers, or contacts in a social networking application. The first user may decrypt each encrypted computation of equality using a first private key.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
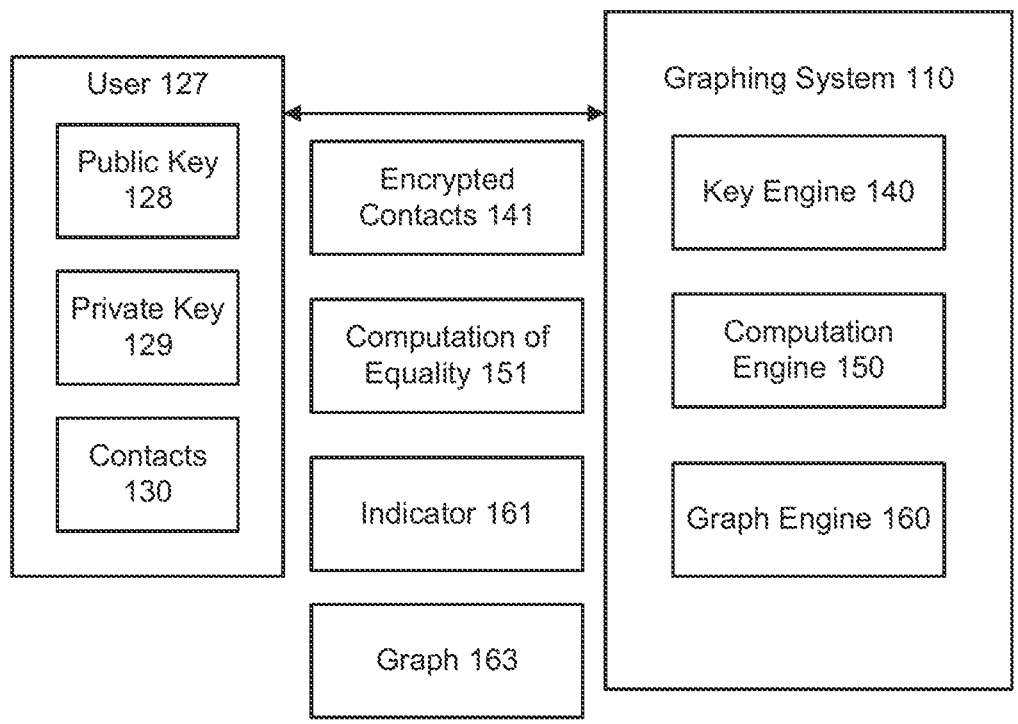
FIG. 1 is an illustration of an example system for graphing relationships in applications.

FIG. 1 is an illustration of a graphing system 110 that generates graphs 163 based on the relationships of users 127 in an application. In the example shown, the graphing system 110 may include a key engine 140, a computation engine 150, and a graph engine 160. More or fewer components may be supported. The graphing system 110 may be implemented using one or more general purpose computing devices such as the computing device 400 illustrated in FIG. 4.

The graphing system 110 may generate graphs 163 that represent the relationships of users 127 in an application. Example applications include social networking applications (e.g., Facebook, Twitter, and LinkedIn), messaging applications (e.g., iMessage, SMS applications, WhatsApp, e-mail applications, or telephone applications). Other applications may be supported.

Each user 127 may be associated with an account in the application and may have a relationship with one or more other users 127 of the application. A user 127 that another user 127 has a relationship with in the application is referred to herein as a contact 130. Example contacts 130 may include "friends" and "followers" in a social networking application, stored email addresses in an email application, and stored phone numbers in a telephone or SMS application. Depending on the embodiment, a user 127 may have a relationship with any user 127 that they communicated with using the application.

In order to generate a graph 163 for the users 127 of an application that preserves the anonymity and privacy of the users 127, each user 127 of the application may generate a public key 128 and a private key 129. The public key 128 and private key 129 of the user 127 may be generated by a graph application associated with the user 127. For example, a user 127 may install a graph application on an associated mobile device (or other computing device) of the user 127. Any method for generating a public key 128 and a private key 129 may be used. Note that the embodiments described herein are not limited to any particular type of encryption and may be used with any homomorphic encryption system.

Each user 127 may generate encrypted contacts 141 using their contacts 130 and their generated public key 128. Continuing the example above, the graph application on the mobile device of a user 127 may retrieve the contacts 130 from the social networking application or messaging application used by the user 127 and may encrypt them using the public key 128 to generate the encrypted contacts 141.

The key engine 140 may receive, from each user, the public key 128 of the user 127 and the encrypted contacts 141 of the user 127. Because the contacts 141 are encrypted using the public key 128 of a user 127, the key engine 140 (or any other user 127) cannot decrypt and view the encrypted contacts 141 without the corresponding private key 129.

The key engine 140 may provide each user 127 with all of the public keys 128 received from the other users 127. Depending on the embodiment, the graph application on the mobile device (or other computing device) may receive and store the public keys 128 of the other users. Any method for transmitting and storing a public key 128 may be used.

Each user 127 may encrypt their contacts 130 with the received public keys 128. In particular, for each received public key 128, the user 127 may generate a set of encrypted contacts 141 using the received public key 128 and the contacts 130. Continuing the example above, the sets of encrypted contacts 141 may be generated by the graph applications.

Each user 127 may provide each generated set of encrypted contacts 141 to the key engine 140. Accordingly, after the encrypted contacts 141 are received, the key engine 140 may have, for each unique user 127, a set of encrypted contacts 141 for every other user 127 encrypted using the public key 128 of the unique user 127.

The computation engine 150 may, for each unique user 127, compute an encrypted computation of equality 151 for each contact pair that includes an encrypted contact 141 of the user 127 and an encrypted contact 141 of another user that was also encrypted using the public key 128 of the particular user. Depending on the embodiment, a result of the encrypted computation of equality 151 may indicate that the contacts in the pair are same or may indicate that the contacts in the pair are not the same. However, the result of the computation may not be determinable by the computation engine 150 (or any other user 127) without the private key 129 of the particular user 127. In one embodiment, if the result of the computation is a specified value such as zero (or alternatively one), then the contacts in the pair are the same. Any other value may indicate that the contacts in the pair are not the same. Other types of computations may be used.

Each user 127 may receive its associated encrypted computations of equality 151 from the graph engine 160. Each user 127 may then decrypt its received encrypted computations of equality 151 using its associated private key 129 to determine the results of the computations. Depending on the embodiment, each user 127 may then provide indicators 161 of the results to the graph engine 160. The indicators 161 may be binary values that indicate for each contact pair whether or not the contacts in the pair were the same user.

The graph engine 160 may receive the indicators 161 from each user 127 and may use the received indicators 161 to generate a graph 163 of the relationships of application (e.g., social networking application). Because the identities of the particular users 127 cannot be determined from the graph 163, the graph may be provided to third parties for research and analysis purposes while protecting the anonymity and privacy of the users 127.

Figure 2:
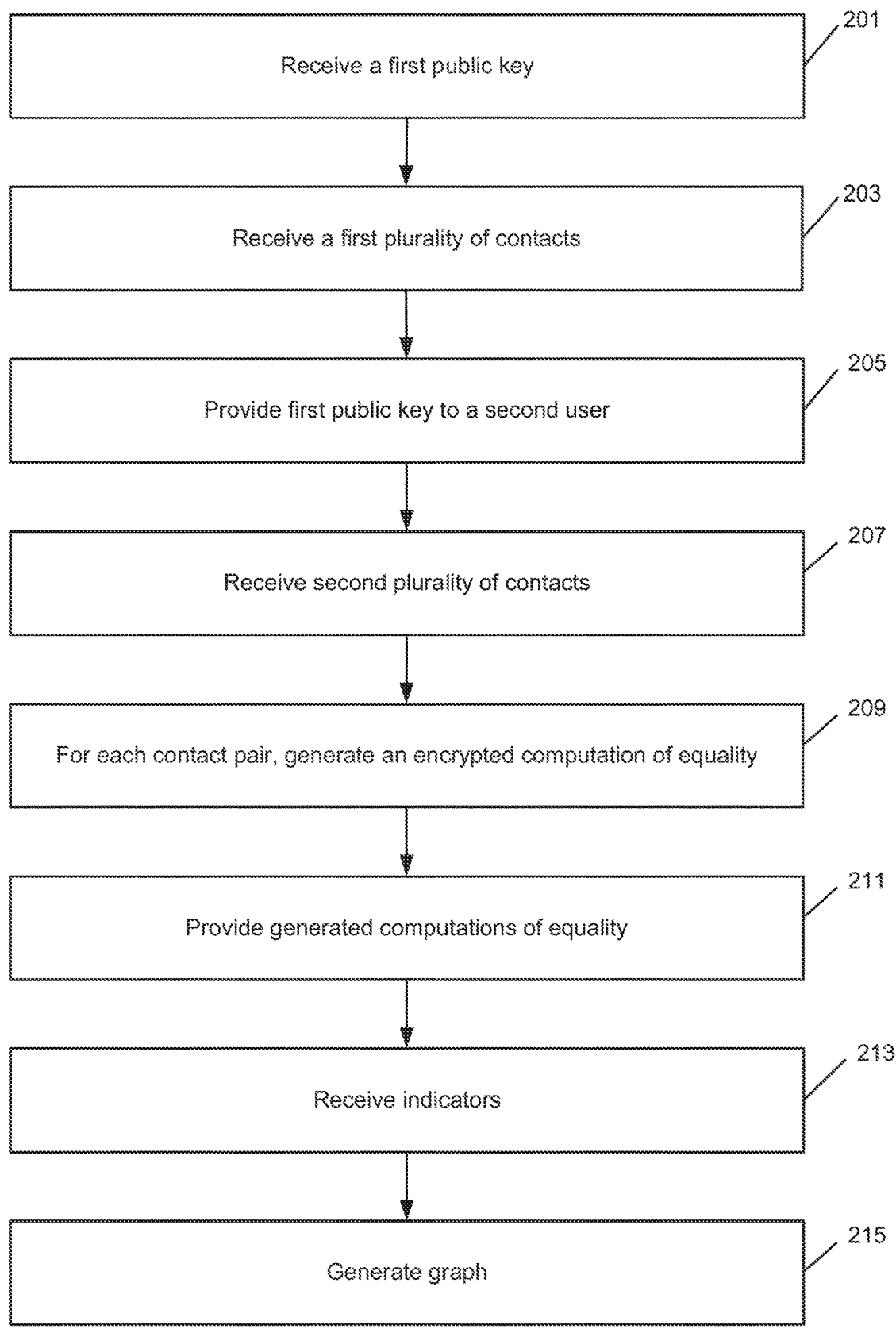
FIG. 2 is an illustration of an example method for graphing relationships in an application while preserving the anonymity of users.

FIG. 2 is an illustration of an example method for generating a graph representation of the relationship between a first user and a second user in an application. The method 200 may be implemented by the graphing system 110. The application may be a social networking application or an email application, for example. Other types of applications or methods of communication may be supported.

At 201, a first public key is received. The first public key 128 may be received by the key engine 140 of the graphing system 110 from a first user 127. The first user 127 may have an account in an application such as a social networking application. The first public key 128 may be an encryption key that is published by the first user 127. The first user 127 may have a corresponding private key 129 that is secret and can be used by the first user 127 to decrypt data encrypted using the first public key 128. Any method for homomorphic encryption may be used.

At 203, a first plurality of contacts is received. The first plurality of contacts may be encrypted contacts 141 that were encrypted by the first user 127 using the first public key 128. The contacts 141 may be contacts of the user in the application. Where the application is social networking application, the contacts 141 may be the "friends" of the first user 127. Where the application is a telephone, SMS application, or messaging application, the contacts may be telephone numbers or account identifiers.

At 205, the first public key is provided to a second user. The first public key 128 may be provided by the key engine 140 to the second user 127. The second user 127 may be another user 127 of the application (e.g., social networking application). The second user 127 may or may not have any contacts in common with the first user 127 including the first user 127 themselves.

At 207, a second plurality of contacts is received. The second plurality of contacts 141 may be encrypted contacts 141 that were encrypted by the second user 127 using the first public key 128.

At 209, for each contact pair from the first plurality of contacts and the second plurality of contacts, an encrypted computation of equality is generated by the computation engine 150. Each encrypted computation of equality 151 may be generated by the computation engine 150 using the first public key 128. As may be appreciated, a computation of equality of a pair of contacts may be a value that indicates whether or not the contacts of the pair are equal. However, the value of the computation of equality 151 cannot be read by the computation engine 150 (or anyone else) without the private key 129 corresponding to the first public key 128. Because only the first user 127 has the private key 129, only the first user 127 may read the values of the generated computations of equality 151.

At 211, the generated computations of equality are provided. The computations of equality 151 are provided by the computation engine 150 to the first user 127. The first user 127 may receive the computations of equality 151 and may use the private key 129 to determine the values for each contact pair. Based on the value for each pair of contacts, the first user 127 may generate an indicator 161 of whether or not the contacts in the pair of contacts are the same. The first user 127 may provide the indicators 161 to the graph engine 160.

At 213, the indicators are received. The indicators 161 are received by the graph engine 160.

At 215, a graph is generated. The graph 163 may be generated by the graph engine 160 using the indicators 161. The graph 163 may be a representation of the relationship of the first user 127 and the second user 127 in the application. The application may be a social networking application. In some embodiments, the graph engine 160 may generate the graph 163 by generating a node for each contact pair whose received indicator 161 indicates that the contacts are the same. The graph engine 160 may then connect each generated node to a node representing the first user 127 and a node representing the second user 127 using an edge. Any method for generating a graph may be used. The method 200 may be repeated for each pair of users 127 of the application to complete the graph 163.

Figure 3:
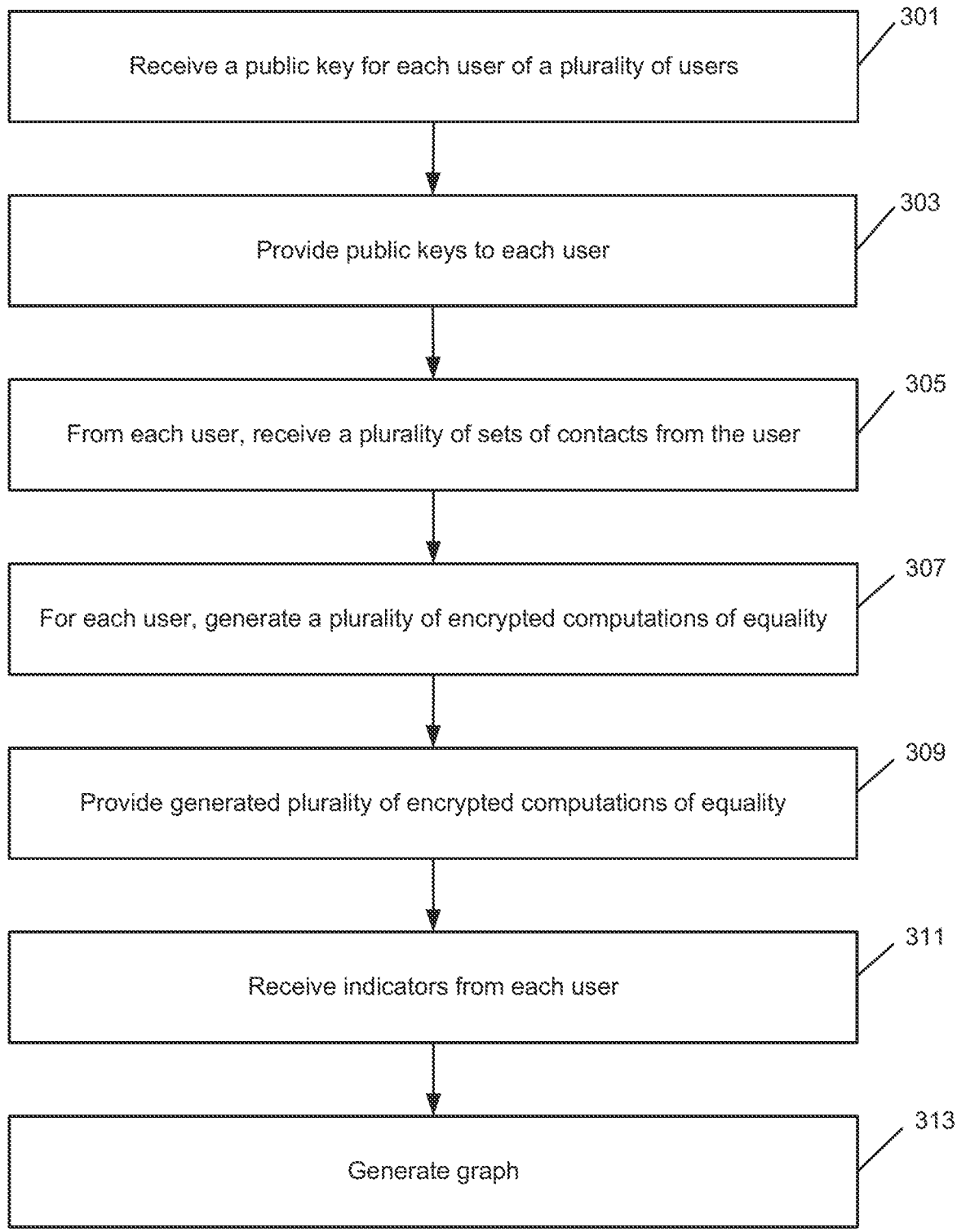
FIG. 3 is an illustration of an example method for graphing relationships in an application while preserving the anonymity of the users.

FIG. 3 is an illustration of an example method for generating a graph representation of the relationship between a plurality of users in an application. The method 300 may be implemented by the graphing system 110. The application may be a social networking application or an email application, for example. Other types of applications may be supported.

At 301, a public key is received for each user of a plurality of users. The public keys 128 may be received by the key engine 140 of the graphing system 110. Each public key 128 may be unique to the associated user 127 and may have a corresponding private key 129 that is kept secret by the associated user 127. The keys may be generated by a graph application that is installed on computing devices associated with each user.

At 303, the received public keys are provided to each user. The received public keys 128 are provided to each user 127 by the key engine 140.

At 305, a plurality of sets of contacts is received from each user. The plurality of sets of contacts 141 may be received by the key engine 140. Each set of contacts 141 received from a user 127 may be encrypted using a public key 128 of a different user 127 of the plurality of users 127.

At 307, for each user, a plurality of encrypted computations of equality are generated. The encrypted computations of equality 151 may be generated by the computation engine 150. The encrypted computations of equality 151 for a user 127 may be generated by the computation engine 150 for each pair of contacts 141 encrypted using the public key 128 of the user 127 received by the key engine 140. Each pair may include a contact of the user 127 and a contact of another user 127 of the plurality of users 127.

At 309, the generated encrypted computations of equality are provided to each user. The generated encrypted computations of equality are provided to each user 127 by the computation engine 150.

At 311, indicators are received from each user. The indicators 161 may be received from each user 127 by the graph engine 160. Each indicator 161 received for a user 127 may indicate whether or not an associated received encrypted computations of equality 151 showed that the corresponding pair of contacts 141 were the same or equal.

At 313, a graph is generated. The graph 163 may be generated from the indicators 161 received for each user 127 by the graph engine 160. In particular, the graph 163 may be generated by the graph engine 160 making a node for each user 127 and connecting the nodes based on the received indicators 161 from each user 127.

Figure 4:
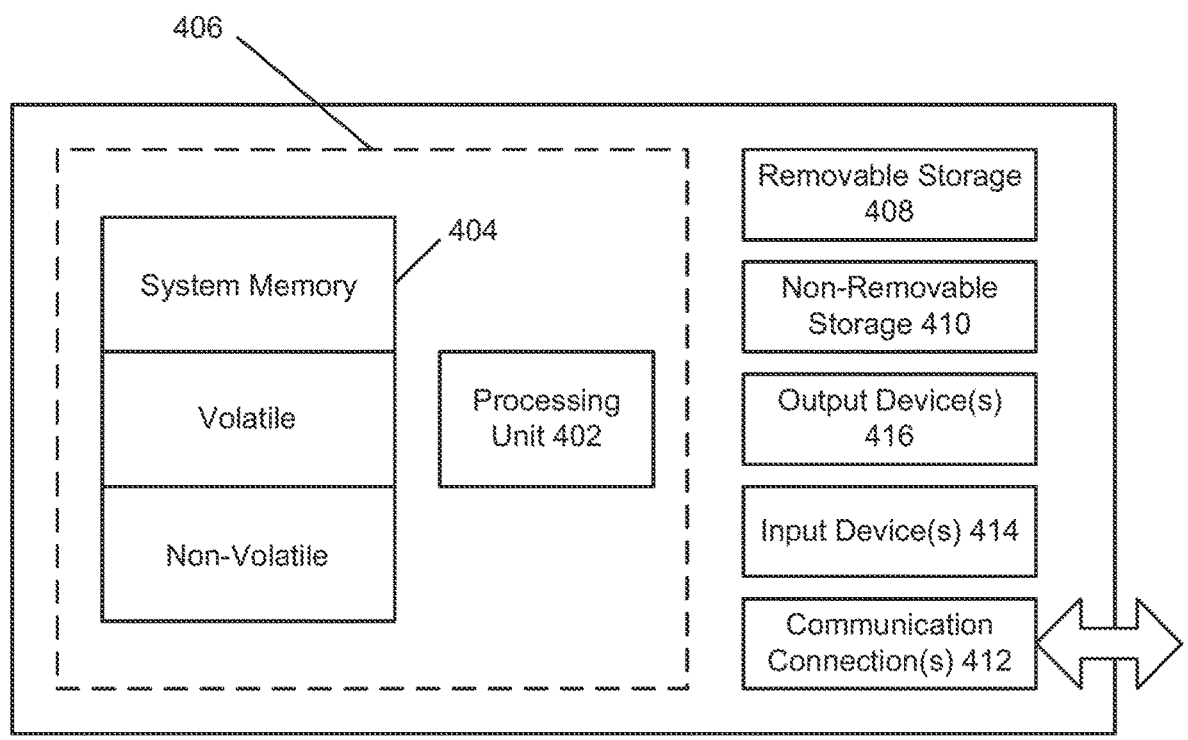
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for graphing relationships in an application while providing anonymity comprising:
receiving, from a first computing device of a first user of a social networking application, a first public key of the first user by a second computing device;
receiving, from the first computing device of the first user of the social networking application, a first plurality of contacts in the social networking application by the second computing device, wherein each contact of the first plurality of contacts is encrypted by the first computing device of the first user using the first public key;
providing the first public key to a third computing device of a second user of the social networking application by the second computing device;
receiving, from the third computing device of the second user, a second plurality of contacts in the social networking application by the second computing device, wherein each contact of the second plurality of contacts is encrypted by the third computing device of the second user using the first public key of the first user;
for each contact pair comprising a contact from the first plurality of contacts and a contact from the second plurality of contacts, generating an encrypted computation of equality for the contact pair using the first public key of the first user by the second computing device; and
providing the generated encrypted computation of equality for each contact pair to the first computing device of the first user by the second computing device.

2. The method of claim 1, further comprising:
receiving, for each contact pair, an indication of whether the contacts in the pair are the same or different by the second computing device from the first user; and
generating a graph of the relationship between the first user and the second user in the application using the received indication for each pair by the second computing device.

3. The method of claim 2, further comprising repeating the steps for each user of a plurality of users of the social networking application.

4. The method of claim 1, wherein the first user decrypts each encrypted computation of equality using a first private key.

5. A method for graphing relationships in an application while providing anonymity comprising:
for each user of a plurality of users of a social networking application, receiving a public key associated with the user from a user computing device associated with the user by a server computing device, wherein each user of the plurality of users is associated with a different user computing device of a plurality of user computing devices;
for each user of the plurality of users, providing the public key associated with the user to each user of the plurality of users at their associated user computing device by the server computing device;
for each user of a plurality of users, receiving a plurality of sets of contacts associated with the user by the server computing device, wherein each set of contacts associated with the user is encrypted by the user computing device associated with the user using a public key of a different user of the plurality of users;
for each user of the plurality of users, generating a plurality of encrypted computations of equality for each contact of the user and each contact of a different user of the plurality of users that was encrypted using the public key of the user by the server computing device; and
for each user of the plurality of users, providing the generated plurality of encrypted computations for the user at their associated user computing device by the server computing device.

6. The method of claim 5, further comprising:
for each user of the plurality of users, receiving, for each encrypted computation of the plurality of computations associated with the user, an indication of whether encrypted computation was correct or incorrect; and
generating a graph of the relationships of the users of the application using the received indications by the server computing device.

7. A system for graphing relationships in an application while providing anonymity comprising:
at least one processor; and
a memory storing a plurality of instructions that when executed by the at least one processor cause the at least one processor to:
receive a first public key of a first user from a first computing device of a first user of a social networking application;
receive, from the first computing device of the first user of the social networking application, a first plurality of contacts in the social networking application, wherein each contact of the first plurality of contacts is encrypted by the first computing device of the first user using the first public key;
provide the first public key to a second computing device of a second user of the social networking application;
receive, from the second computing device of the second user, a second plurality of contacts in the social networking application, wherein each contact of the second plurality of contacts is encrypted by the second computing device of the second user using the first public key of the first user;
for each contact pair comprising a contact from the first plurality of contacts and a contact from the second plurality of contacts, generate an encrypted computation of equality for the contact pair using the first public key of the first user; and
provide the generated encrypted computation of equality for each contact pair to the first computing device of the first user.

8. The system of claim 7, further comprising instructions that when executed by the at least one processor cause the at least one processor to:
receive, for each contact pair, an indication of whether the contacts in the pair are the same or different from the first user; and
generate a graph of the relationship between the first user and the second user in the application using the received indication for each pair.

9. The system of claim 8, further comprising repeating the steps of claim for each user of a plurality of users of the social networking application.

10. The system of claim 7, wherein the first user decrypts each encrypted computation of equality using a first private key.

* * * * *